United States Patent
Perruchot et al.

(10) Patent No.: US 9,495,595 B2
(45) Date of Patent: Nov. 15, 2016

(54) METHOD AND SYSTEM FOR DETECTING A STREAM OF ELECTROMAGNETIC PULSES, AND DEVICE INCLUDING SUCH A DETECTION SYSTEM AND INTENDED FOR ELECTROMAGNETICALLY GUIDING AMMUNITION TOWARD A TARGET

(75) Inventors: Ludovic Perruchot, Elancourt (FR); Hervé Lonjaret, Elancourt (FR); Arnaud Beche, Elancourt (FR)

(73) Assignee: THALES, Neuilly sur Seine (FR)

(*) Notice: Subject to any disclaimer, the term of this patent is extended or adjusted under 35 U.S.C. 154(b) by 262 days.

(21) Appl. No.: 13/994,523

(22) PCT Filed: Dec. 16, 2011

(86) PCT No.: PCT/EP2011/073106

§ 371 (c)(1),
(2), (4) Date: Sep. 3, 2013

(87) PCT Pub. No.: WO2012/080492

PCT Pub. Date: Jun. 21, 2012

(65) Prior Publication Data

US 2013/0336536 A1    Dec. 19, 2013

(30) Foreign Application Priority Data

Dec. 16, 2010 (FR) ..................... 10 04914

(51) Int. Cl.
*G06K 9/00* (2006.01)
*F41G 3/14* (2006.01)
*F41G 7/22* (2006.01)
*G01S 3/784* (2006.01)
(Continued)

(52) U.S. Cl.
CPC ............. *G06K 9/0063* (2013.01); *F41G 3/145* (2013.01); *F41G 7/226* (2013.01); *F41G 7/2293* (2013.01);
(Continued)

(58) Field of Classification Search
None
See application file for complete search history.

(56) References Cited

U.S. PATENT DOCUMENTS 3,743,216 A * 7/1973 Salonimer ..................... 244/3.16
5,430,290 A * 7/1995 Merle et al. ............... 250/208.1
(Continued)

FOREIGN PATENT DOCUMENTS

EP    0633457 A1    1/1995
EP    0833168 A1    4/1998

OTHER PUBLICATIONS

International Search Report, dated Mar. 15, 2012, which issued during the prosecution of International Patent Application No. PCT/EP2011/073106, of which the present application is the national phase.

*Primary Examiner* — Vu Le
*Assistant Examiner* — Alexander J Lesnick
(74) *Attorney, Agent, or Firm* — Troutman Sanders LLP (57) ABSTRACT

A method for detecting a stream of electromagnetic pulses emitted, according to a predefined occurrence law, in a scene observed using a detection system comprising a matrix detector and a processing unit for processing signals comprising the electromagnetic pulses. The method includes the following steps: acquiring and transmitting the signals from the matrix detector to the processing unit, and for each pixel of the detector calculating a subtraction signal between two signals acquired during two consecutive time windows of the same length, calculating a signal for accumulating the subtraction signals spaced apart in time by an interval defined by the predefined occurrence law, and thresholding the accumulation signal, the pulse being detected if the accumulation signal is greater than a predetermined threshold for at least one pixel, and locating the pulse detected in the observed scene from the coordinates of the pixel including the detected pulse.

10 Claims, 4 Drawing Sheets

(51) Int. Cl.
*G01S 7/487* (2006.01)
*G01S 17/00* (2006.01)
*G01S 17/66* (2006.01)

(52) U.S. Cl.
CPC ............... *G01S 3/784* (2013.01); *G01S 7/487* (2013.01); *G01S 17/003* (2013.01); *G01S 17/66* (2013.01); *G01S 7/4873* (2013.01)

(56) References Cited

U.S. PATENT DOCUMENTS

| | | | |
|---|---|---|---|
| 5,703,639 A * | 12/1997 | Farrier et al. | 348/241 |
| 6,023,058 A | 2/2000 | Merle et al. | |
| 2010/0067608 A1* | 3/2010 | Tyree et al. | 375/285 |

* cited by examiner

METHOD AND SYSTEM FOR DETECTING A STREAM OF ELECTROMAGNETIC PULSES, AND DEVICE INCLUDING SUCH A DETECTION SYSTEM AND INTENDED FOR ELECTROMAGNETICALLY GUIDING AMMUNITION TOWARD A TARGET

CROSS-REFERENCE TO RELATED APPLICATIONS

This application is the National Stage of International Application No. PCT/EP2011/073106 filed Dec. 16, 2011 and published as WO 2012/080492 on Jun. 21, 2012. The International Application claims priority to French Application Serial No. 10 04914 filed on Dec. 16, 2010. All of the above applications are incorporated herein by reference.

FIELD OF THE INVENTION

The present invention relates to a method for detecting a stream of electromagnetic pulses transmitted, according to a predefined occurrence law, in a scene observed by an operator using a detection system for detecting a stream of electromagnetic pulses including a matrix signal detector and a processing unit for processing the signals, the signals including the electromagnetic pulses

BACKGROUND

The invention applies to the field of optoelectronic systems for detecting electromagnetic pulses. These systems in particular equip aerial platforms (carrier airplanes, combat airplanes, drones and helicopters), maritime platforms and land-based platforms (combat soldiers, armored vehicles, troop transport, etc.) designed for surveillance and/or combat, as well as laser-guided missiles or bombs.

In particular, the invention is designed for systems particularly of the infrared laser spot tracking (LST) type, laser designation pods (LDP) or self-guided (SG) missile or laser-guided bomb devices. These systems are based on image processing technologies that detect localized electromagnetic pulses, preferably laser pulses.

Figure 1:
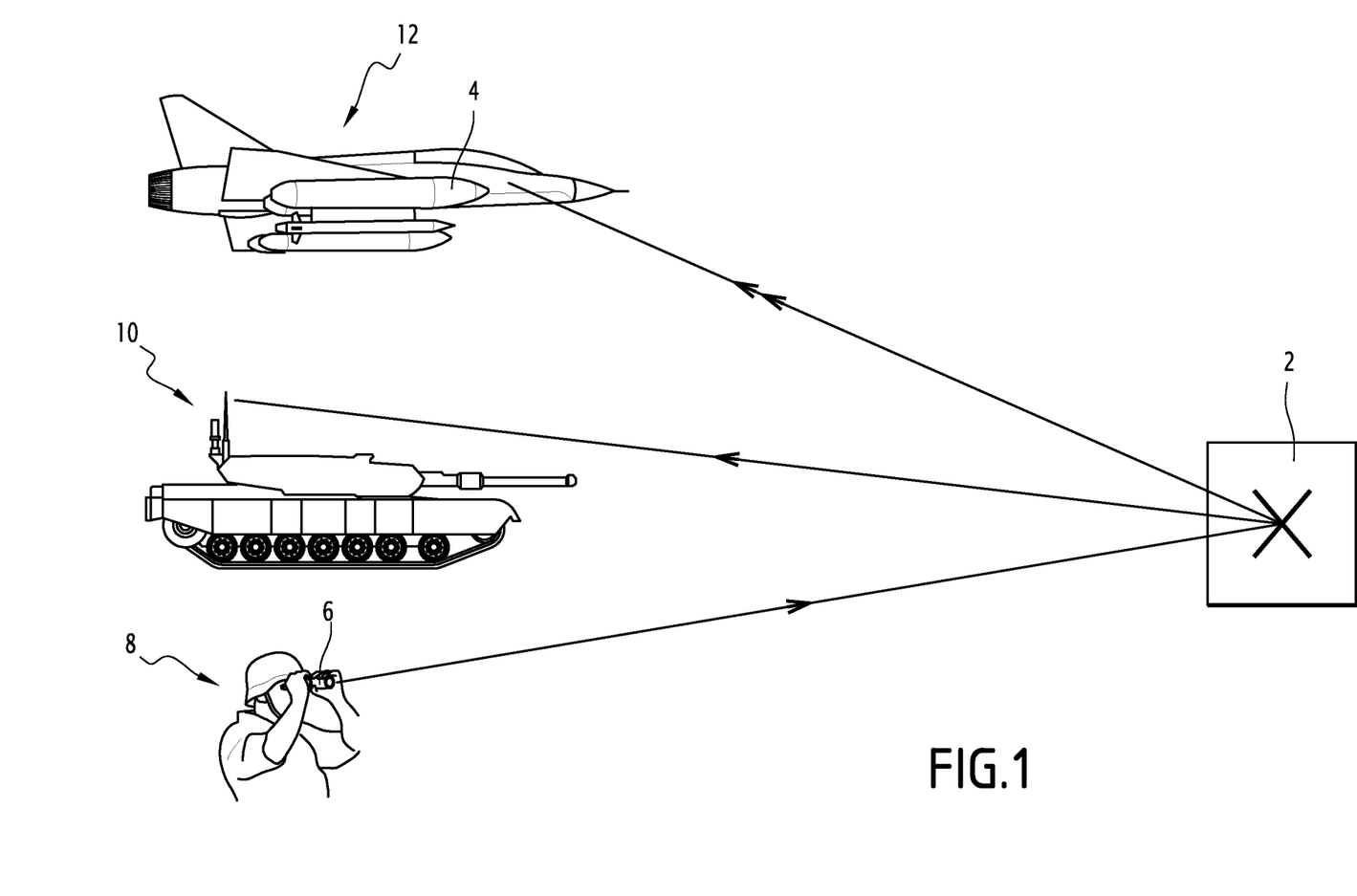
FIG. 1 is a block diagram of one example application of a system for detecting a flow of electromagnetic pulses according to the invention.

For example, FIG. 1 illustrates one example application of the invention involving different players: a combat soldier equipped with binoculars, a tank, and an airplane equipped with a missile or bomb. The combat soldier on the ground designates a target to be processed to an airborne support fleet, for example a target to be eliminated by the fleet. To that end, the combat soldier designates the target using a laser designator that comprises a laser source capable of illuminating the target so as to guide ammunition or a weapon, such as a bomb or missile, or to facilitate the targeting of a weapon or light ammunition. The laser designators thus supply information that is useful in targeting the laser-guided ammunition, such as missiles or bombs. Such airborne ammunition includes a so-called self-guided device comprising a spot laser system and means (deviation indicator) measuring the deviation or error between the target and the trajectory of the ammunition. Thus, this airborne ammunition detects the spot laser, the frequency of which is very specific, and adjusts its trajectory based on that spot laser. Owing to spot laser detection algorithms, then the enslavement of the trajectory based on the detected spot laser, the ammunition reaches the target with a very high precision, for example less than 1 m.

The airborne fleet must know the precise position of the target, since the receiving cone of a bomb is limited.

To detect these streams of electromagnetic pulses, pulse detectors exist called quadrant detectors. This type of detector operates continuously. The spot of the electromagnetic pulses on the target is imaged on the quadrant detector. Then, thresholding is done so as to detect the useful signal with respect to the noise using means for processing signals acquired by the quadrant detectors. The latter parts then calculate the respective weight of the image of the illumination spot on each quadrant, i.e., the proportion of the image of the illumination spot on each quadrant.

Such a quadrant detector is connected to means for processing information transmitted by it, for example calculating the ratio of the weights on each quadrant of the illumination spot. These processing means make it possible to calculate the direction of the target that must be followed by ammunition or a guided weapon to reach it. To that end, from direction information, the navigation means of the ammunition connected to the processing means seek to balance the signals over all of the quadrants, which amounts to centering the line of sight on the target.

A laser guiding device for guiding a missile toward the target includes such quadrant detectors and information processing means so as to transmit, for example to the missile, the direction to be followed as far as the target.

One drawback of such a device is that the precision depends on the location of the target in the field of vision and is not constant over the entire field of vision. Thus, it may be excellent at the center of the field, but mediocre at the edge of the field of vision.

In order to increase the precision of the guidance, the electromagnetic pulse detectors include matrix detectors having more pixels than a quadrant detector, for example 100 pixels×100 pixels.

For such devices, the spot corresponding to an illumination pulse is imaged on a single pixel of the detector or on four pixels, thereby improving its location precision. In that case, these devices do not include weighting steps and directly provide the location of the pixel imaging the illumination spot, and consequently the direction of the target.

However, these detectors have an integration time that is substantially equal to a millisecond and operate at 1 kHz, thereby causing an increase in the noise in the detected signal.

Consequently, this type of detector does not perform as well in terms of signal-to-noise ratio, but has an instantaneous field of view (IFV) that is much better than quadrant detectors.

SUMMARY

The aim of the invention is to provide a method and a device for detecting a flow of electromagnetic pulses that performs better than the current devices and that combines a good signal-to-noise ratio with better precision of the spatial location of the target identified by the spot resulting from the flow of electromagnetic pulses or the direction of the target and capable of looking for the transmission frequency of the flow of electromagnetic pulses.

To that end, the invention relates to a detection method of the aforementioned type, characterized in that it has the following steps. Calculating, using the processing unit, an accumulation signal for each pixel, the accumulation signal being the sum of the subtraction signals, spaced apart in time by an interval defined by the predefined occurrence law of the transmission of electromagnetic pulses. Thresholding, using the processing unit, the accumulation signal for each pixel, the laser pulse being detected if the accumulation signal is above a predetermined threshold for at least one pixel, and locating the detected electromagnetic pulse in the observations scene from coordinates of the pixel comprising the detected electromagnetic pulse.

According to specific examples, the detection method includes one or more of the following features, considered alone or in combination. The matrix detector is a matrix of sensors capable of performing a continuous acquisition of signals and the signal acquired during a time window is the instantaneous signal at a given moment of that time window. The matrix detector is a matrix of sensors having a same integration time, the signals acquired by the detector over one time window being the integration in time over the time window of the instantaneous signal received by the sensor. The accumulation signal is calculated for all of the successive time windows with the same predefined occurrence law. The predefined occurrence law is such that the electromagnetic pulses are transmitted with a constant repetition frequency and the accumulation signal calculated for each pixel is the sum of the subtraction signals spaced apart in time by an interval substantially equal to an integer multiple of the inverse of the repetition frequency of the electromagnetic pulses. The repetition frequency of the electromagnetic pulses is substantially comprised between 10 and 20 Hz. The predetermined threshold corresponds to a signal-to-noise ratio comprised between 7 and 14. The predetermined threshold is calculated from the local noise in the signals acquired by the matrix detector.

The invention also relates to a system for detecting a flow of electromagnetic pulses transmitted according to a predefined occurrence law in an observation scene including a matrix signal detector and a processing unit for processing the signals connected to each other, the signals including the electromagnetic pulses, the processing unit being capable of receiving the signals acquired and transmitted by the matrix detector and includes means for calculating a subtraction signal for each pixel of the matrix detector, the subtraction signal being the difference between two signals acquired on two consecutive time windows with the same length. The system being characterized in that the processing unit has
- means for calculating an accumulation signal for each pixel, the accumulation signal being the sum of the subtraction signals spaced apart in time by an interval defined by the predetermined occurrence law for the transmission of the electromagnetic pulses, means for thresholding the accumulation signal for each pixel, the laser pulse being detected if the subtraction signal is greater than a predetermined threshold for at least one pixel, and means for locating the detected electromagnetic pulse in the observation scene from the coordinates of the pixel comprising the detected electromagnetic pulse, and in that the detection system is capable of implementing the preceding method.

The invention also relates to a device for electromagnetically guiding ammunition toward a target, the target being identified by a flow of electromagnetic pulses, the device being characterized in that it includes a system for detecting a flow of electromagnetic pulses as previously described to detect and locate a flow of electromagnetic pulses identifying the target, and means for guiding the ammunition toward the target from the detection of the flow of electromagnetic pulses by the detection system, the detection system being connected to the guide means and transmitting the location of the detected flow of electromagnetic pulses to it.

BRIEF DESCRIPTION OF THE DRAWINGS

The invention will be better understood upon reading the following description, provided solely as an example, and done in reference to the drawings, in which.

DETAILED DESCRIPTION

The invention relates to a system for detecting a flow of electromagnetic pulses in an observation scene designed to be integrated into an airborne, maritime or land-based platform such as an airplane, helicopter, drone, armored vehicle, combat soldier equipped with binoculars, missile, bomb, etc. This type of platform is designed for surveillance and/or combat.

FIG. 1 illustrates one example application of a system for detecting a flow of electromagnetic pulses according to the invention. Said system is designed to be integrated into a laser guiding device for ammunition, for example a missile or a bomb, guiding the latter toward a target 2, the target 2 being identified by the flow of electromagnetic pulses.

The target 2 is illuminated by a designator integrated into an optoelectronic system and including an electromagnetic source transmitting such a flow of electromagnetic pulses, preferably a laser source.

The source transmitting the electromagnetic pulses preferably operates outside the visible spectrum so as to be less easily identified by the enemy.

The laser designation is implemented by troops on the ground, such as combat soldiers or tanks, or the firing airplane, or another airplane, just as the guided ammunition may be guided by laser, i.e., "following" the spot laser, representative of the flow of electromagnetic pulses, detected and loosed by the combat soldier, tank or airplane.

The electromagnetic pulses are transmitted according to a predefined occurrence law in the observation scene toward the target.

For example, the laser designator illuminates the target with a flow of electromagnetic pulses at a constant frequency of several occurrence Hz. Each electromagnetic pulse is very short, for example in the vicinity of several tens of nanoseconds.

Another example consists of transmissions of electromagnetic pulses at predetermined time intervals, but which are different from one another.

FIG. 1 illustrates one example application of the invention in which the transmitter of the flow of electromagnetic pulses is integrated into the binoculars 6 of a combat soldier 8, while the system for detecting the flow of electromagnetic pulses and the electromagnetic guide device are integrated into a land-based platform 10, for example the tank and/or an airborne platform 12, such as a combat plane.

Figure 2:
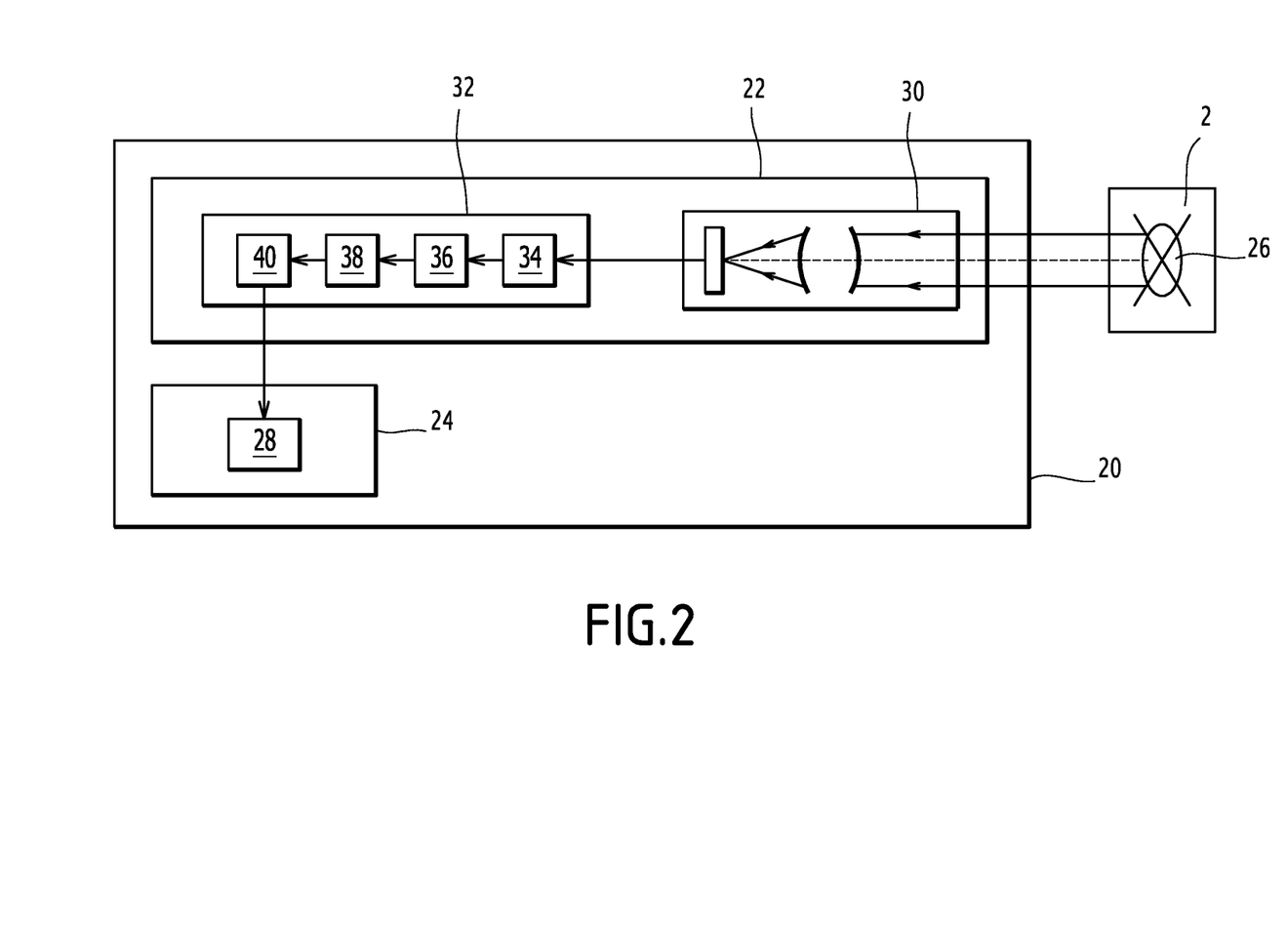
FIG. 2 is a block diagram of a system for guiding ammunition toward a target including a system for detecting a flow of electromagnetic pulses identifying the target according to the invention.

FIG. 2 shows an electromagnetic guide device 20, preferably laser-guided, comprising a detection system 22 for detecting a flow of electromagnetic pulses according to the invention to detect and locate a flow of electromagnetic pulses identifying the target 2.

Furthermore, the electromagnetic guide device 20 comprises means 24 for guiding ammunition, for example a missile, toward the target 2 from the detection by the detection system 22 of the illumination spot 26 resulting from the illumination of the target 2 by a transmitter of flows of electromagnetic pulses.

The detection system 22 is connected to the guide means 24 and sends them the location of the target from the location of the detected flow of electromagnetic pulses, or more specifically the detected illumination spot 26 resulting from the transmission of the flow of electromagnetic pulses toward the target 2.

The guide means 24 for guiding the ammunition include means 28 for enslaving the trajectory of the ammunition based on the detected spot 26, the ammunition then reaching the target with great precision.

The system 22 for detecting the flow of electromagnetic pulses according to the invention comprises at least one matrix detector 30 detecting signals that are representative of the flow of electromagnetic pulses and a processing unit 32 for processing the signals connected to each other. Of course, the signals include the electromagnetic pulses to be detected.

According to an example of the detection system according to the invention, the matrix detector is a matrix of sensors having a same integration time and a constant sampling frequency. Consequently, the signals acquired by the detector over a time window are the result of the integration in time over the time window of the instantaneous signal received by the sensor.

For example, the matrix detector is a matrix of 100 pixels×100 pixels, and the signals acquired by the detector form images.

The processing unit 32 is capable of receiving the signals acquired and transmitted by the matrix detector 30. It includes first calculation means 34 for calculating a subtraction signal for each pixel of the matrix detector 30.

The subtraction signal is the difference between two signals acquired over two consecutive time windows with the same length, i.e., two consecutive images.

The processing unit 32 further includes second calculation means 36 connected to the first calculation means 34 and capable of calculating an accumulation signal for each pixel. The accumulation signal is the sum of the subtraction signals spaced apart in time by an interval defined by the same predefined transmission model of the electromagnetic pulses.

Preferably, the detection system is stabilized so that the electromagnetic pulses of the same flow of pulses are positioned in a same pixel for the accumulation calculation.

According to one alternative, the detection system includes means for readjusting signals acquired by the matrix detector as a function of inertial information of the detection systems so that during the calculation of the accumulation signal, the signals corresponding to electromagnetic pulses of a same flow of pulses are positioned in a same pixel. The accumulation signal is calculated for all of the successive time windows with the same predefined law. Thus, the accumulation signal is calculated even if the subtraction signals do not include an electromagnetic pulse.

Furthermore, the processing unit 32 comprises thresholding means 38 for thresholding the accumulation signal for each pixel. An electromagnetic pulse is detected if the accumulation signal is above a predetermined threshold for at least one pixel. The predetermined threshold is preferably calculated from the local noise in the image for at least one pixel.

The threshold means 38 are connected to the second calculation means 36 and to location means 40 for locating the electromagnetic pulse detected in the observation scene from coordinates of the pixel comprising the detected electromagnetic pulse. These location means 40 are integrated into the processing unit 32.

The detection system 22 according to the invention implements the method for detecting a flow of electromagnetic pulses that will now be described in light of FIGS. 3 and 4.

The electromagnetic pulses are transmitted according to a predefined occurrence law in an observation scene.

Preferably, the electromagnetic pulses are transmitted with a repetition frequency substantially comprised between 10 and 20 Hz.

The method begins with the acquisition by the matrix detector 30 of the detection system 22 of signals representing images of the target in the scene at an image acquisition frequency that is much higher than the transmission frequency of the electromagnetic pulses.

For example, the matrix detector operates at an imaging rhythm substantially equal to 1 kHz, i.e., approximately 100 times higher than the transmission frequency of the electromagnetic pulses.

Of course, some of the acquired signals include the electromagnetic pulses to be detected.

Then, the matrix detector 30 sends the acquired signals or images to the processing unit 32 of the detection system 22.

The method continues with a step for the calculation, by the first calculation means 34 of the processing unit 32, of a subtraction signal for each pixel of the matrix detector 30.

As previously indicated, this subtraction signal is the difference between two signals acquired on two consecutive time windows of the same length.

Preferably, the signals acquired by the detector form images.

Figure 3:
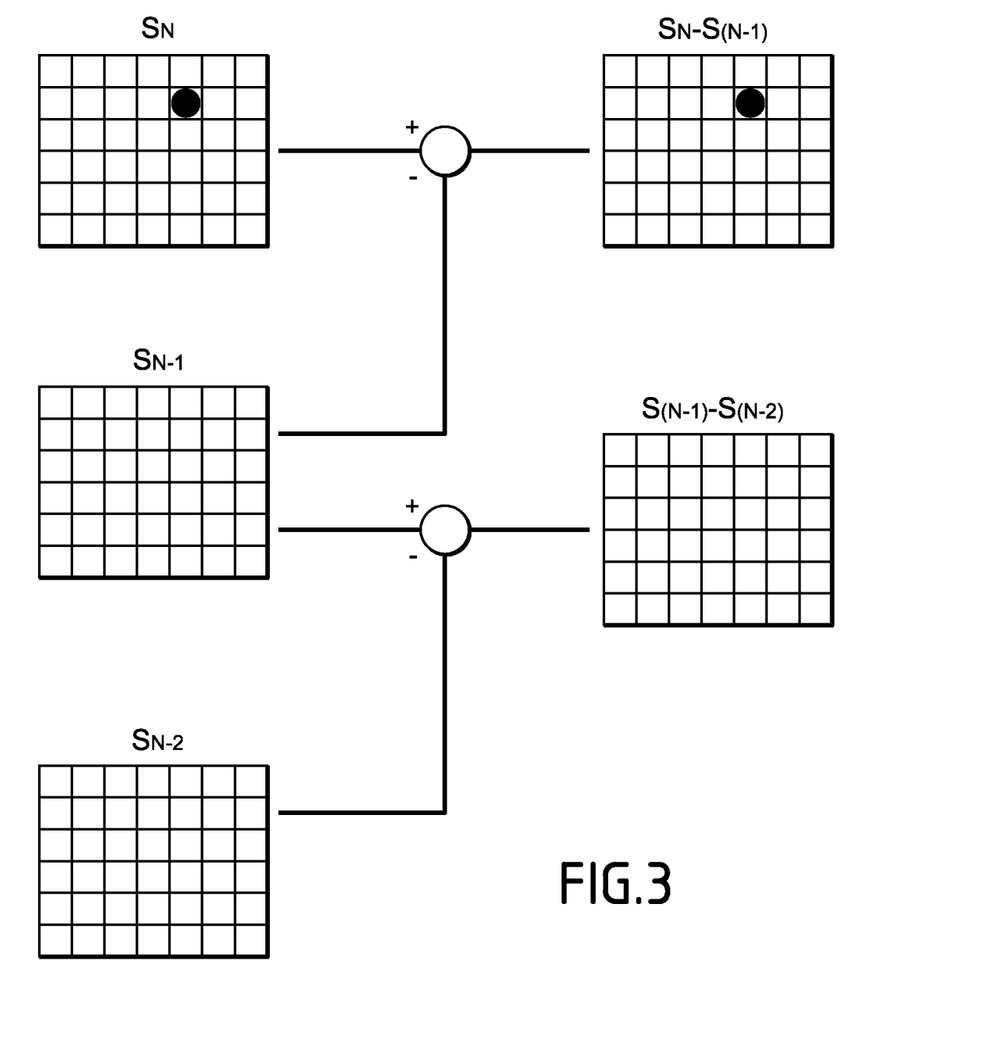
FIG. 3 is a block diagram illustrating the result of a subtraction step between two consecutive images according to the invention when one of the two images does or does not comprise an image of the electromagnetic pulse.

The result of this calculation is illustrated in FIG. 3. Thus, the subtraction signal calculated by the processing unit is an image resulting from the subtraction of the intensity of the image N−1 from the image N, pixel by pixel.

For a signal or an image N comprising a pulse to be detected, the subtraction of that image N with the previous image N−1, which does not comprise that pulse, yields an image or subtraction signal in which the pulse is still present, unlike the signal or subtraction image of the images N−1 and N−2, not containing a pulse.

This subtraction calculation is done for any pair of consecutive images or signals.

Figure 4:
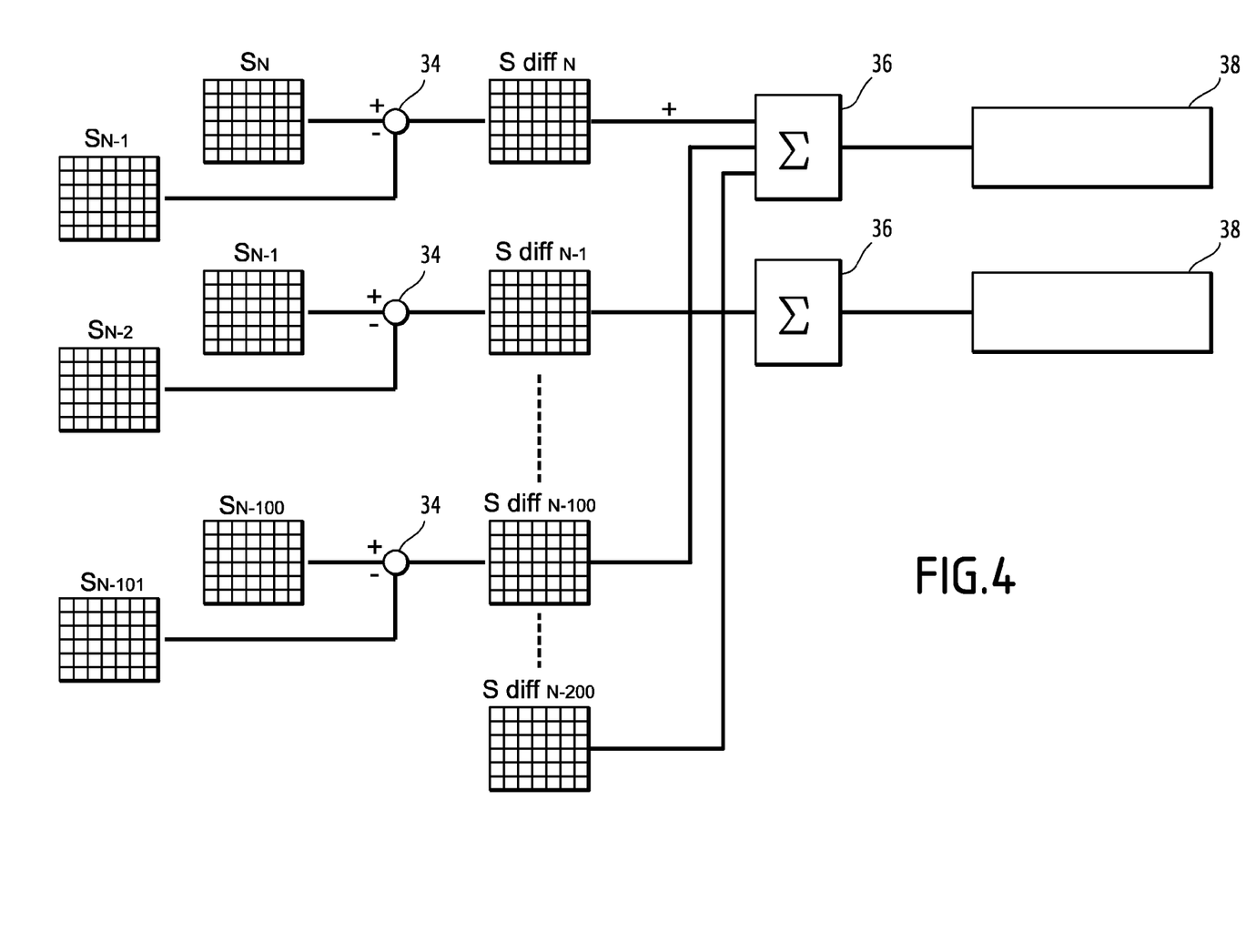
FIG. 4 is a block diagram of a method for detecting a flow of electromagnetic pulses implemented by a detection system according to the invention.

As shown in FIG. 4, one thus obtains a plurality of subtraction signals, here subtraction images, denoted Image diff N−i.

The method continues with a step for calculating an accumulation signal for each pixel, using the second calculation means 36 of the processing unit 32.

The accumulation signal is the sum of the subtraction signals spaced apart over time by an interval defined by the predetermined occurrence law for transmission of the electromagnetic pulses.

In particular, for a predefined occurrence law such that the electromagnetic pulses are transmitted with a constant repetition frequency, the accumulation signal calculated for each pixel is then the sum of the subtraction signals spaced apart in time by an interval equal to a whole multiple of the inverse of the repetition frequency of the electromagnetic pulses.

For example, for an image rhythm of approximately 1 kHz and a repetition frequency of the electromagnetic pulses of 10 Hz, a pulse is present every 100 acquired images. As a result, by only adding those images, the signal-to-noise ratio is increased, as well as the detection reliability of the electromagnetic pulses.

Then, a thresholding step is carried out using the thresholding means 38 of the processing unit 32 for the signals resulting from the step for calculating the accumulation signal for each pixel.

A laser pulse is then detected if the accumulation signal is above a predetermined threshold for at least one pixel. The predetermined threshold is calculated from the local noise in the image for at least one pixel. Preferably, said predetermined threshold corresponds to a signal-to-noise ratio comprised between 7 and 14.

Lastly, the method continues with a location step, by the location means 40 of the processing unit 32, for locating the electromagnetic pulse detected in the observation scene from coordinates of the pixel comprising the detected electromagnetic pulse.

According to another example, the detection system is identical to that previously described with the exception of the matrix detector, which is a matrix of sensors capable of continuously acquiring signals, for example, a quadrant detector.

In that case, the signal acquired during a time window is the instantaneous signal at a given moment of that time window. The continuous signal is sampled at a high sampling frequency, for example 1 ns, so as to identify particular events in the signal, in particular pulses with a width substantially equal to 20 ns, for example.

Then, sample flows are built, each having a duration defined by the desired occurrence law. For example, if the desired repetition frequency of the pulses is 10 Hz, corresponding to a time recurrence every 100 ms, a so-called "pulse" flow is built including 10 million samples so that the flow has a duration of 10,000,000×1 ns, i.e., 100 ms.

Subsequently, two consecutive sampling flows are subtracted to form the subtraction signals. Then, the accumulation signal is calculated by adding the subtraction signals in phase by the processing unit.

The detection system according to this example of the invention implements a detection method identical to the previous one. Thus, the device and the method for detecting a flow of electromagnetic pulses in a scene according to the invention makes it possible to improve the performance of the detection of those electromagnetic pulses without limiting the integration time.

This device and this system make it possible, with simple processing operations, such as a subtraction and an addition, to detect electromagnetic pulses with a low signal-to-noise ratio and thereby to increase the detection range while preserving a very good location of the electromagnetic pulse.

Furthermore, a detection system according to the invention, stabilized or including means for readjusting the signals acquired by the matrix detector as a function of the inertial information from the detection system so that, during the calculation of the accumulation signal, the signals corresponding to electromagnetic pulses of a same flow of pulses are positioned in a same pixel, improves its detection effectiveness for detecting flows of electromagnetic pulses. Furthermore, the calculation of the accumulation signal being done for all of the images, irrespective of whether they comprise an electromagnetic pulse, makes it possible to detect the flow of electromagnetic pulses even if the time origin of the transmission of the flow of electromagnetic pulses is not known.

This device and method furthermore make it possible to look for the transmission code, i.e., the repetition frequency of the flow of electromagnetic pulses.

In fact, if the repetition frequency of the flow of magnetic pulses is different from the desired frequency, the subtraction signals spaced apart in time by the interval defined by the desired occurrence law are not in phase. Consequently, the signal-to-noise ratio of the calculated accumulation signal will be attenuated by said accumulation step rather than being amplified, as is the case for signals having a frequency corresponding to the desired occurrence law. In the latter case, the subtraction signals spaced apart in time by the interval defined by the desired occurrence law are in phase, thereby making it possible to increase the signal-to-noise ratio of the calculated accumulation signal. Thus, this method makes it possible to distinguish between several sources transmitting different codes.

The invention claimed is:

1. A method for detecting a flow of electromagnetic pulses transmitted, according to a predefined occurrence law, in a scene observed by an operator, the predefined occurrence law defining a predetermined time interval between the electromagnetic pulses, the method using a detection system detecting a stream of electromagnetic pulses including a matrix detector having a plurality of pixels and detecting signals for each pixel, and a processing unit processing the signals, the signals including the electromagnetic pulses, the method comprising the steps of:
   acquiring signals by the matrix detector, each signal being associated with a respective pixel of the matrix detector and being acquired during a time window having a duration that is shorter than a duration of the predetermined time interval;
   transmitting the signals from the matrix detector to the processing unit;
   calculating, by the processing unit, a subtraction signal for each pixel and for each time window, the subtraction signal being the difference between the respective signal, associated with the pixel, acquired during the time window, and a consecutive signal, associated with the pixel, acquired during a consecutive time window of the same duration;
   calculating, using the processing unit, a plurality of accumulation signals for each pixel, each accumulation signal being the sum of a plurality of subtraction signals spaced apart in time by an intervening time which is equal to an integer multiple of the predetermined time interval plus or minus one hundredth of the duration of the time window;
   thresholding, using the processing unit, the accumulation signals for each pixel, the flow of electromagnetic pulses being detected if at least one of the accumulation signals is above a predetermined threshold for at least one pixel; and
   locating the detected electromagnetic pulses in the observations scene from coordinates of the pixel comprising the detected electromagnetic pulses.

2. The detection method according to claim 1, wherein the matrix detector is a matrix of sensors capable of performing a continuous acquisition of signals and the signal acquired during a time window is the instantaneous signal at a given moment of that time window.

3. The detection method according to claim 1, wherein the matrix detector is a matrix of sensors having a same integration time, the signals acquired by the detector over one time window being the integration in time over the time window of the instantaneous signal received by the sensor.

4. The detection method according to claim 1, wherein the predetermined time interval is constant.

5. The detection method according to claim 4, wherein the predetermined time interval is between 50 and 100 msec.

6. The detection method according to claim 1, wherein the predetermined threshold corresponds to a signal-to-noise ratio between 7 and 14.

7. The detection method according to claim 1, wherein the predetermined threshold is calculated from the local noise in the signals acquired by the matrix detector.

8. A system for detecting a flow of electromagnetic pulses transmitted according to a predefined occurrence law in an observation scene, the predefined occurrence law defining a predetermined time interval between the electromagnetic pulses, the system including a matrix detector having a plurality of pixels and detecting signals for each pixel, and a processing unit connected to the matrix detector, processing the signals, the signals including the electromagnetic pulses, each signal being associated with a respective pixel of the matrix detector and being acquired during a time window having a duration that is shorter than a duration of the predetermined time interval, the processing unit receiving the signals acquired and transmitted by the matrix detector, the system comprising:
   a first calculator calculating a subtraction signal for each pixel and for each time window, the subtraction signal being the difference between the signal, associated with the pixel, acquired during the time window, and a consecutive signal, associated with the pixel, acquired during a consecutive time window of the same duration;
   a second calculator calculating accumulation signals for each pixel, each accumulation signal being the sum of a plurality of subtraction signals spaced apart in time by an intervening time which is equal to an integer multiple of the predetermined time interval plus or minus one hundredth of the duration of the time window;
   a thresholder thresholding the accumulation signals for each pixel, the flow of electromagnetic pulses being detected if at least one of the accumulation signals is greater than a predetermined threshold for at least one pixel; and
   a locator locating the detected electromagnetic pulses in the observation scene from the coordinates of the pixel comprising the detected electromagnetic pulse, wherein
   the detection system is capable of implementing the method according to claim 1.

9. A device for electromagnetically guiding ammunition toward a target, the target being identified by a flow of electromagnetic pulses, the device comprising:
   a system for detecting a flow of electromagnetic pulses according to claim 8 to detect and locate a flow of electromagnetic pulses identifying the target, and
   a guidance device guiding the ammunition toward the target from the detection of the flow of electromagnetic pulses by the detection system,
   wherein the detection system is connected to the guidance device and transmits the location of the detected flow of electromagnetic pulses to it.

10. The detection method according to claim 1, wherein the intervening time is equal to the predetermined time interval, plus or minus one hundredth of the duration of the time window.

* * * * *